United States Patent
Zoelfl et al.

(10) Patent No.: US 11,174,144 B2
(45) Date of Patent: Nov. 16, 2021

(54) UNIT AND METHOD FOR STORING AND DISTRIBUTING CONTAINERS, AND FILLING PLANT

(71) Applicant: Krones AG, Neutraubling (DE)

(72) Inventors: Markus Zoelfl, Metten/Berg (DE); Rudolf Fiegler, Regensberg (DE); Stefan Raith, Pfatter (DE); Peter Lindner, Langquaid (DE)

(73) Assignee: Krones AG, Neutraubling (DE)

(*) Notice: Subject to any disclaimer, the term of this patent is extended or adjusted under 35 U.S.C. 154(b) by 119 days.

(21) Appl. No.: 16/491,556

(22) PCT Filed: Jan. 3, 2018

(86) PCT No.: PCT/EP2018/050110
§ 371 (c)(1),
(2) Date: Sep. 5, 2019

(87) PCT Pub. No.: WO2018/162120
PCT Pub. Date: Sep. 13, 2018

(65) Prior Publication Data
US 2020/0031648 A1 Jan. 30, 2020

(30) Foreign Application Priority Data
Mar. 7, 2017 (DE) .................... 10 2017 203 729.6

(51) Int. Cl.
*B67C 3/00* (2006.01)
*B65G 47/51* (2006.01)
*B67B 3/26* (2006.01)

(52) U.S. Cl.
CPC .......... *B67C 3/007* (2013.01); *B65G 47/5104* (2013.01); *B67B 3/261* (2013.01)

(58) Field of Classification Search
CPC .......... B67C 3/007; B67C 3/202; B67C 3/22; B67C 7/002; B67C 7/004; B65G 1/1378;
(Continued)

(56) References Cited

U.S. PATENT DOCUMENTS 4,691,496 A * 9/1987 Anderson ............... B65B 57/10
141/144
9,266,706 B2 * 2/2016 Forestelli .................. B67B 3/26
(Continued)

FOREIGN PATENT DOCUMENTS

| EP | 2233412 A1 | 9/2010 | |
| WO | 2011030207 A1 | 3/2011 | |
| WO | WO-2011030207 A1 * | 3/2011 | ............. B67B 3/261 |

OTHER PUBLICATIONS

International Search Report and Written Opinion for International Patent Application No. PCT/EP2018/050110 dated Mar. 22, 2018, 12 pages.

*Primary Examiner* — Valentin Neacsu
*Assistant Examiner* — Jacob A Smith
(74) *Attorney, Agent, or Firm* — Lowenstein Sandler LLP

(57) ABSTRACT

The present disclosure describes a storage and distribution unit for a container filling plant and a method for storing and distributing the containers. A store is provided, which comprises storage areas for containers, the storage areas being distributed in a grid pattern, a container feed for connection to a discharge line section of a filling line, and a container outlet for connection to inspection units. The storage and distribution unit comprises a robot for putting filled containers into storage by transferring them from the container feed to the storage areas as well as for taking the containers out of storage by transferring them from the storage areas to the container outlet. Making use of a programmable control unit, the robot can be controlled for selectively taking the (Continued)

containers out of storage independently of the moment in time at which and/or the sequence in which they have been put into storage.

20 Claims, 2 Drawing Sheets

(58) Field of Classification Search
CPC .... B65G 47/51; B65G 47/5104; B65G 47/90; B67B 3/00; B67B 3/26; B67B 3/261; B65B 5/105; B65B 65/003; B65B 2210/02
USPC ......... 53/52, 53, 75, 76, 167, 282, 443, 471, 53/502
See application file for complete search history.

(56) References Cited

U.S. PATENT DOCUMENTS

| | | | | |
|---|---|---|---|---|
| 2006/0266003 | A1* | 11/2006 | Topf | F15B 11/125 53/281 |
| 2006/0283145 | A1* | 12/2006 | Weisgerber | B07C 5/3408 53/167 |
| 2008/0121569 | A1* | 5/2008 | Ottmann | B07C 5/122 209/522 |
| 2010/0192521 | A1* | 8/2010 | Clusserath | B67C 3/28 53/473 |
| 2010/0243501 | A1* | 9/2010 | Monti | B65G 47/5104 206/446 |
| 2014/0043421 | A1* | 2/2014 | Lindner | B07C 5/3408 347/106 |

\* cited by examiner

UNIT AND METHOD FOR STORING AND DISTRIBUTING CONTAINERS, AND FILLING PLANT

RELATED APPLICATIONS

This Application is a National Stage of International Application No. PCT/EP2018/050110 filed Jan. 3, 2018, which claims the benefit of German Patent Application 10 2017 203 729.6 filed Mar. 7, 2017, both of which are incorporated by reference herein.

FIELD OF THE INVENTION

The present invention relates to a storage and distribution unit for a container filling plant and to a method for storing and distributing filled containers in a container filling plant.

BACKGROUND

U.S. Pat. No. 9,266,706 B2 discloses a filling plant for filling a liquid product into containers, such as beverage bottles. According to this reference, the filled and sealed containers are, on the hand, passed through inline inspection units as a continuous product stream and, in addition, a few containers are fed on a random basis to a discharge line section by means of a discharge device for offline inspection. This serves e.g. to check, on a random basis, a closure force, a weight, a gas content and/or an internal pressure of the containers. Finally, associated measurement data are evaluated statistically, so as to assess the quality of individual processing steps and the functionality of the devices used. Bottles inspected by non-destructive examination can be returned to the main product line section of the filling line.

Problems arise here from the fact that different amounts of time are required for the individual inspections in the main product line section as well as in the discharge line section. For example, the containers must rest for a certain period of time prior to certain inspections and/or the inspection itself takes a comparatively long time. In this case, slow inspections delay or block the inflow of containers to inspections that take less time, in particular in the event that individual inspections are serially linked. This is disadvantageous for the performance of the control system and of the filling line in its entirety. As a result, such control systems usually cannot be used to full capacity in an efficient manner and incorporating them is therefore difficult from the point of view of transport technology.

BRIEF DESCRIPTION OF THE DRAWINGS

Preferred embodiments are shown in the drawings, in which.

DETAILED DESCRIPTION

Figure 1:
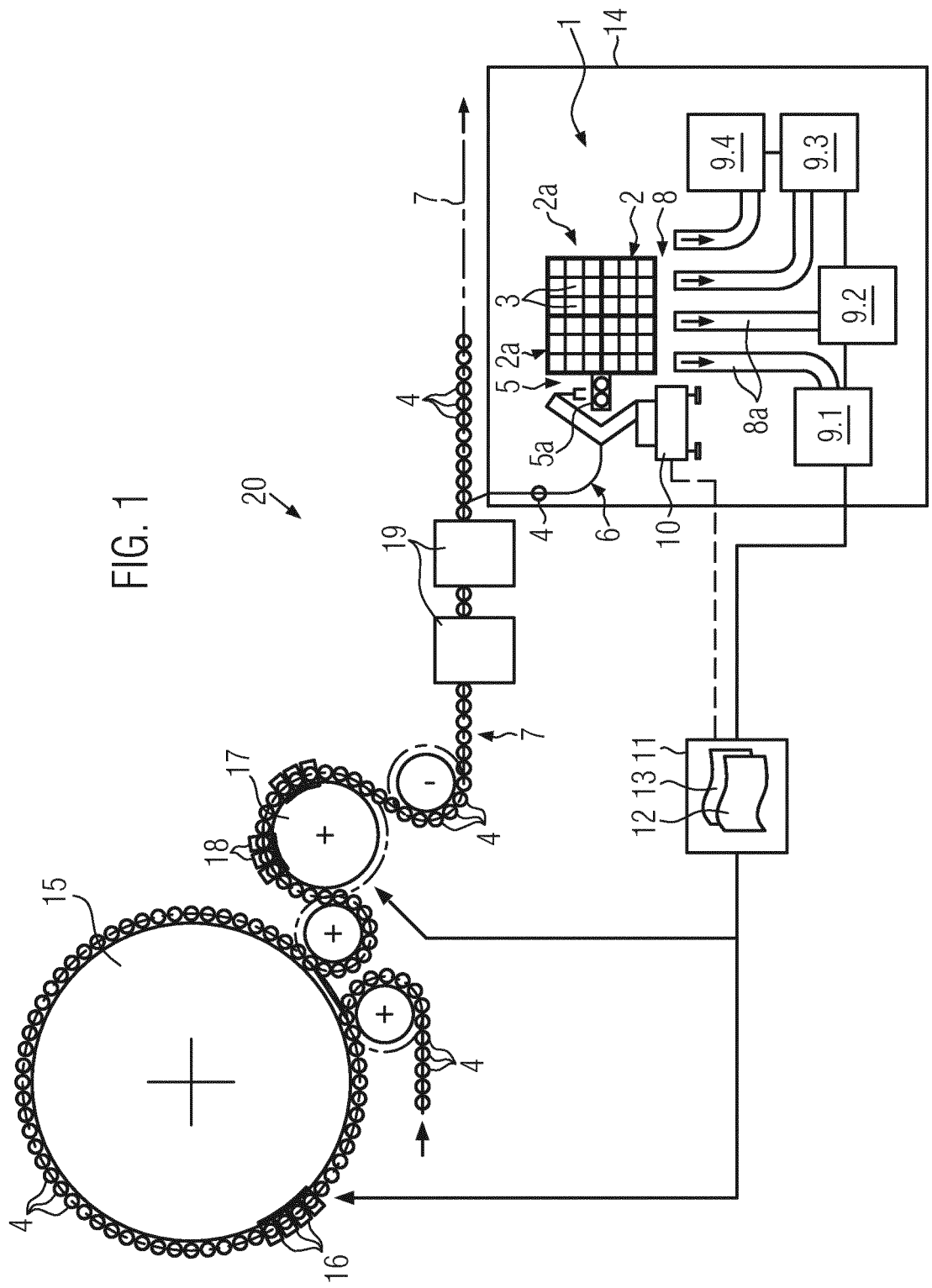
FIG. 1 shows a schematic top view of a container filling plant comprising the storage and distribution unit and the associated inspection units.

Embodiments described herein include a storage and distribution unit. This storage and distribution unit is suitable for use with a container filling plant. In embodiments, a store is provided, which comprises storage areas for individual containers, the storage areas optionally being distributed in a grid pattern, a container feed for connection to a discharge line section of a filling line, and a container outlet for connection to downstream inspection units. The storage and distribution unit further comprises a robot for putting filled containers into storage by transferring them from the container feed to the storage areas as well as for taking the containers out of storage by transferring them from the storage areas to the container outlet. Making use of a programmable control unit, the robot may be controlled and configured for selectively taking the containers out of storage independently of the moment in time at which and/or the sequence in which they have been put into storage. The container inspection can thus be decoupled in time from the associated sampling and the associated inspection units can be used to full capacity in an efficient manner. The storage and distribution unit described in embodiments provides for a more efficient offline inspection of filled containers as compared to prior solutions.

The robot is preferably configured as a handling unit or an industrial robot. The latter may e.g. be a gantry robot, an articulated robot, a SCARA robot or a hexapod robot. A distribution may also be executed by means of a distribution starwheel.

The storage and distribution unit thus allows decoupling the container feed from the container outlet in time and space, i.e. decoupling the inflow of individual containers from their distribution to the inspection units. In this way, the storage areas, which are especially arranged in a grid pattern, allow an incoming sequence of containers to be reliably assigned to the inspections provided therefor. This means that containers can be stored intermediately in individual storage areas for a predetermined period of time in a freely selectable manner, and can there reliably be retrieved for demand-dependent taking out of storage.

The containers can, on the one hand, be taken out of storage at a time suitable for the respective inspection and guided to the assigned inspection unit. For example, the sequence in which the containers are taken out of storage may deviate in an arbitrary manner from the sequence in which they have been put into storage. In particular, container waiting times of different lengths are possible, depending on the utilization and availability of individual inspection units, and thus an optimization of the utilization of the inspection units in their entirety.

The inspection units are in particular offline inspection units for inspecting, under laboratory conditions, containers discharged from a product stream on a random basis. In contrast thereto, all the containers of a specific product stream are guided through inline inspection units that work faster.

Preferably, the control unit is configured for putting containers into storage and/or taking them out of storage on the basis of an electronically stored sampling plan and/or inspection plan. The sampling plan is based, for example, on the number of processing units to be monitored, such as filling units, capping units or the like, batch sizes, batch changes or the like. The inspection plan is based, for example, on the capacity of the inspection units and the time required for individual inspections and may take into account the availability of individual inspection units or the like.

Time sequences that are specified by the sampling plan and the inspection plan can thus be decoupled from one another. Production control can thus be optimized more flexibly. This is made possible by intermediately storing the containers in the storage and distribution unit.

Preferably, the container feed comprises a conveyor belt for successively providing the containers, in particular according to a sequence of an electronically stored sampling plan. If necessary, the containers may rest on the conveyor belt and/or be advanced in cycles and/or at a comparatively low conveying speed, such as 0.5 m/s maximum, so that they can be picked up individually by the robot and transferred into one of the respective storage areas.

Particularly preferred, the robot may be equipped with a gripper, which allows several containers to be transferred simultaneously from the conveyor belt to the storage unit. The gripper may be configured as a linear gripper and may grip and/or move e.g. two, four or eight containers at the same time.

Preferably, the store comprises at least eight storage areas, in particular at least sixteen storage areas. This allows intermediate storage of the containers in a correspondingly flexible manner, if necessary also over a prolonged period of time. The storage areas may be specifically adapted to the bottom cross-section of the container type to be inspected, or configured to accommodate containers of different sizes.

Preferably, the store comprises at least one replaceable storage insert for providing the storage areas, the control unit being in this case configured for storing and precisely retrieving a storage grid defined by the at least one storage insert and the storage areas, respectively. Hence, the number of storage areas and/or their storage surfaces or cell sizes can be varied and thus adapted to the container dimensions to be processed.

In particular, various storage grids are retrievably stored in the control unit of the robot. The store may e.g. comprise one or a plurality of beverage crates or one or a plurality of storage inserts that are exchangeable in an equivalent manner. Alternatively, the store may also comprise a continuous storage surface, which is only functionally divided into individual storage areas by programmed control of the robot.

The storage unit may preferably be a paternoster store. The storage cells of this store may be configured for the largest container diameter to be processed. Particularly preferred, the accommodating cross-section of the storage cells, e.g. in the sense of a surface on which the containers lie, is round or semicircular, whereby automatic centering will take place in the case of round container cross-sections. This makes it particularly easy to remove the containers.

The control of the robot is preferably based on the respective given storage grid. Hence, the storage and distribution unit can be adapted to different types of containers in a flexible manner. When the containers are put into storage and taken out of storage, they are preferably handled in their neck area and/or at the closure of the containers.

Preferably, the container outlet comprises at least one conveyor belt or an equivalent transport path for connection to an inspection unit.

According to a particularly advantageous embodiment, at least two, in particular at least two different inspection units are provided downstream of the storage unit. This allows a parallel inspection operation and a particularly efficient inspection, when carrying out inspections with different time requirements per container.

For example, a plurality of parallel transport paths may lead to the inspection units, or one transport path, e.g. in the form of a linear conveyor, may lead to a plurality of parallel inspection units. For this purpose, a linear conveyor may run along the entries of a plurality of inspection units. The linear conveyor has preferably two opposing (forward/backward) directions of movement, in which the containers can be moved in a flexible sequence to the entries of certain inspection units.

For example, it is imaginable to assign one inspection unit having a comparatively long inspection time per container to one of the parallel transport paths and two serially connected inspection units having a comparatively short inspection time per container to another parallel transport path. This allows an overall time-saving and performance-enhancing inspection in the discharge line section.

The posed task is also solved by a container filling plant, comprising a storage and distribution unit according to one of the above embodiments as well as inspection units arranged downstream thereof and used for checking the containers and/or a product that has been filled into the containers, by measuring a Brix value of the filling product, a $CO_2$ content of the filling product, a diet concentration of the filling product, the original wort of a filling product, the alcohol content, the mixing ratio of a product, a weight of the containers and/or a closing force of the containers.

Such inspection units can then be arranged in a flexible manner downstream of the storage and distribution unit, both in parallel and in series. The storage and distribution unit allows the containers to be efficiently distributed to individual transport paths and/or inspection units. The sequence in which the containers are taken out of storage for the inspection units can here be controlled independently of the sequence in which the containers have been put into storage and the duration of intermediate storage of individual containers.

Preferably, the storage and distribution unit as well as the inspection units will then be arranged under a protective atmosphere in a laboratory area, which is spatially separated from the filling line. The laboratory area is essentially a clean room or the like, which is suitable to be used for inspection. This is facilitated by the fact that the discharge line section can be routed away from the filling line, so as to establish the necessary spatial and atmospheric separation between the filling line and the laboratory area.

Methods of storing and distributing filled containers are also described with reference to embodiments. Such a method serves to store and distribute filled containers in a container filling plant and comprises the following operations: a) providing containers discharged from a filling line; b) putting the containers mechanically into a store comprising storage areas for individual containers, the storage areas being especially distributed in a grid pattern; and c) taking the containers mechanically out of storage and forwarding them to inspection units. The containers are here taken out of storage by means of a programmed control unit selectively as well as independently of the moment in time at which and/or the sequence in which the containers have been put into storage. The advantages described with respect to the above described storage and distribution unit can be achieved in this way.

Preferably, the containers are put into and/or out of storage in accordance with an electronically stored sampling plan and/or inspection plan, in particular for inspecting a specific number of containers per unit time, per production batch and/or per number of containers filled. The sampling plan and the inspection plan can be decoupled from each other and thus each be optimized by intermediately storing the containers in the individual storage areas and also assigning the containers in a reliable manner to individual inspections and inspection units.

Preferably, the containers are purposefully discharged from the filling line and made available with an electronic mark at the store and put into storage there, according to an electronically stored sampling plan. This means that the control unit requests discharge of a container or of a group of containers according to plan. The electronic mark identifies the container(s) during intermediate storage and allows them to be traced until they are taken out of storage for the subsequent inspection. This allows a reliable assignment of inspection results to the processing results and to the processing units, such as filling units or capping units, used for such processing in the container filling plant.

Preferably, when the containers are put into storage, information for identifying the containers, e.g. the filling product and/or the product batch, time stamps, associated filling unit numbers, capping unit numbers and/or associated processing unit numbers, is stored and assigned to the storage area charged with the respective container and/or to the stored container. This allows the data assigned to the container to be comprehensively assigned to the inspection results obtained at the container, e.g. for a statistical evaluation of the inspection results.

Preferably, the containers are taken out of storage according to an electronically stored inspection plan and/or the availability of associated inspection units. The inspection plan shows, for example, the performance of individual inspection units, priorities as regards processing over time, prescribed or admissible rest periods of the containers, maintenance requirements of individual inspection units, such as a need for aids, or the like. In the event of a malfunction or some other non-availability of an inspection unit, for example, the taking out of storage may be postponed for the time being and the container may wait in the storage and distribution unit until the inspection unit is available.

Preferably, the containers are distributed to parallel transport paths and/or inspection units when they are taken out of storage. This allows flexible execution of individual inspection tasks according to the capacity of individual inspection units and the time required for the inspection.

Preferably, the method is further used for inspecting the containers and/or a filling product contained in the containers, and comprises a step d), in which a Brix value of the filling product, a $CO_2$ content of the filling product, a diet concentration of the filling product, a weight of the containers and/or a closing force of the containers are measured.

Preferably, at least two different inspections are executed at different containers such that they overlap in time. This is easy to realize and adaptable in a flexibly manner, in particular in connection with a distribution of the containers to parallel transport paths for increasing the inspection performance.

In addition, the filling line can be changed over to a different product and/or production program during intermediate storage of the containers in the storage and distribution unit.

A distribution unit, in the case of which at least one disposal store and/or disposal conveyor is/are provided and the robot is configured for selectively distributing in particular containers marked as being faulty to the disposal store/conveyor, is advantageous on its own or in combination with at least one of the above described embodiments. Faulty containers have then assigned thereto e.g. an electronic mark accompanying the containers on their further way.

This allows an overall compact structural design and, if necessary, retrofitting of existing filling plants, since containers can be discharged for various purposes on a common discharge line section and from there they can be purposefully inspected or disposed of.

During storage into the disposal store, faulty containers may, in principle, be handled as described above, in particular in an equally gentle manner. This can, for example, prevent containers, which have been filled but not properly sealed, from foaming up due to strong mechanical shocks, whereby the filled product may possibly escape in the form of fountains and cause contamination.

Also the disposal store may comprise storage areas for individual containers. This, however, is not necessary, nor is it necessary to assign the containers to be disposed of to specific storage areas of the disposal store. The disposal conveyor may, for example, guide faulty containers past the inspection units and into a suitable waste container, which is arranged at a suitable location and, if necessary, provided with a splash water protection to the outside.

Preferably, operation a) further comprises providing faulty containers discharged from the filling line, these containers being, in operation b), mechanically put into a separate disposal store and/or mechanically placed on a disposal conveyor, the disposal conveyor leading in particular up to a waste container for faulty and/or offline inspected containers.

A component which, when seen individually or in combination with a distribution unit according to at least one of the above described embodiments, additionally serves to solve the problem in question is a container filling plant comprising a feedback device for data feedback from at least one offline inspection unit for containers, which is connected to a container discharge line section branching off from a main product line section of a filling line, to at least one inline inspection unit for the containers, which is formed upstream of the discharge line section. Also a bidirectional exchange of data is here possible.

The offline inspection unit and the inline inspection unit linked by a feedback connection are then in particular configured for the same type of inspection.

Preferably, a distribution unit is provided, which is able to precisely direct a container that has previously been inspected by the inline inspection unit, to the associated offline inspection unit.

This allows an interaction between respective corresponding offline measurements and inline measurements, e.g. for calibrating, adjusting, etc. the latter. In addition, quality criteria can be observed more effectively, e.g. by approaching a target filling height and/or a target weight through repeated feedback.

The feedback device is in particular a wired or a wireless data transmission path, in particular for transmitting measurement data and/or calibration data to the inline inspection unit.

In this way, e.g. an inline filling level control can be monitored and/or calibrated with one of the offline inspection units. For example, a container is first inspected inline and then the same container is inspected offline.

A particular measurement in one of the offline inspection units connected to the container outlet is usually more accurate than a corresponding measurement in a corresponding inline inspection unit, since offline, for example, more time will be available for the measurement and/or the measurement instruments used will not be exposed to the comparatively rough production conditions of an inline measurement. Consequently, the sensitivity of comparable inspections can be higher offline than inline.

In addition, officially certified and/or calibrated laboratory instruments can be used offline.

Referring now to the figures, as can be seen from FIG. 1, the storage and distribution unit 1 includes a store 2 comprising a plurality of storage areas 3 for individual containers 4, the storage areas 3 being preferably distributed in a grid pattern. The storage areas 3 may be formed by at least one exchangeable storage insert 2a, such as the compartments of a beverage crate. The figure shows exemplarily four storage inserts 2a, which are arranged in contact with one another and which each comprise nine storage areas 3. The number and the size of the storage areas 3 can thus flexibly and easily be adapted to the cross-section of the containers.

The store 2 may also be configured as a paternoster store with functionally suitable storage areas 3 for depositing the containers 4.

The store 2 comprises a container feed 5 for connection of the store 2 to a discharge line section 6, which branches off from a main product line section of a filling line 7 for discharging individual containers 4 on a random basis. The store 2 further comprises a container outlet 8 comprising preferably a plurality of transport paths 8a for connecting the store 2 to inspection units 9.1, 9.2, 9.3, 9.4, the transport paths 8a being in particular loadable in parallel.

The inspection units 9.1, 9.2, 9.3, 9.4 are used for offline inspection of the containers 4 and/or of the filling product contained therein and, in principle, an arbitrary number of them can be connected in parallel and/or in series. Accordingly, the number of transport paths 8a shown is only exemplary.

The storage and distribution unit 1 further comprises at least one robot 10, which, for illustrative purposes only, is shown in a side view in the figure. The at least one robot 10 serves to handle individual containers 4, in particular by taking hold of their neck and/or closure area, when putting them into and taking them out of a respective storage area 3 of the store 2. In principle, also a plurality of coordinated robots 10 may be used for putting the containers 4 into and taking them out of storage.

The robot 10 takes hold of the container 4 at the container feed 5, which is connected to the discharge line section 6 and which may comprise an input-side conveyor belt 5a that is preferably cyclically driven. On this conveyor belt 5a, the containers 4 are provided one after the other, if necessary in a condition of rest upon transfer to the robot 10.

The robot 10 is instructed by a programmable control unit 11 to selectively take individual containers 4 out of storage, essentially independently of the moment in time at which and/or the sequence in which they have been put into storage. The robot 10 takes hold of the containers 4 in the respective occupied storage area 3 and puts the containers 4 down individually at the container outlet 8, in particular on one of the parallel transport paths 8a.

The sequences of movements of the robot 10 during storage by transferring the containers 4 from the container feed 5 to the store 2 and the sequences of movements for removing the containers 4 from the storage areas 3 and moving them to the container outlet 8 are separated from one another by depositing the containers 4 at least once in the storage areas 3. Repositioning the containers 4 in the store 2 is additionally possible. The individual containers 4 can thus be taken out of storage in a variably predeterminable sequence.

Preferably, different storage grids of the store 2 are retrievably stored in the control unit 11 of the robot 10. Each storage grid represents a two-dimensional distribution of the storage areas 3 used, which are predetermined e.g. by a suitable combination and arrangement of storage inserts 2a. For this purpose, beverage crates matching the containers 4 are particularly suitable.

However, depending on the mode of operation of the robot 10 and the stability of the containers 4, the store 2 may, in principle, also have a continuous storage surface without any partitions or the like (not shown), which is only functionally divided into virtual storage areas 3 by the programmed control unit 11 of the robot 10.

Putting into storage is executed according to a specified sampling plan 12, which is preferably stored in the control unit 11. Taking out of storage may then be executed according to the availability and/or the capacity of individual inspection units 9.1, 9.2, 9.3, 9.4 and/or according to an inspection plan 13 that is preferably stored in the control unit 11. The inspection plan 13 may comprise inspection provisions, such as provisions for a groupwise inspection of certain containers 4, e.g. those with identical filling products, as well as information on maximum permissible or minimum required rest periods of the containers 4 in the store 2 or the like.

The storage and distribution unit 1 as well as the inspection units 9.1, 9.2, 9.3, 9.4 are preferably arranged in a laboratory area 14, which is spatially separated from the filling line 7, e.g. in a clean room with a suitable protective atmosphere for the inspections.

Components that are additionally shown for the sake of completeness are a filling machine 15 known per se and comprising filling units 16 for filling the containers 4 with a liquid product, a capping machine 17 known per se and comprising capping units 18 for closing the previously filled containers 4, as well as inline inspection units 19, through which all the containers 4 pass in the area of the filling line 7. Like the storage and distribution unit 1 and the offline arranged inspection units 9.1, 9.2, 9.3, 9.4, also these components are part of a container filling plant 20.

The protective atmosphere area may also extend in a suitable manner from a blow moulding machine (not shown), the filling machine 15 and/or the capping machine 17 up to the laboratory area 14 and the distribution unit 1 and the inspection units 9.1, 9.2, 9.3, 9.4, respectively.

The storage and distribution unit 1 may be used, for example, as follows:

The containers 4 are filled with a liquid product, e.g. a beverage, along the filling line 7 as a continuously conveyed product stream in the filling machine 15 by means of the filling units 16. Subsequently, the filled containers 4 are fed to the capping machine 17 in the manner known, where they are, again as a continuously conveyed product stream, closed by means of the capping units 18 with screw caps or the like.

Subsequently, all the filled and closed containers 4 are guided along the filling line 7 through optionally provided inline inspection units 19, where they are inspected by imaging or the like, by way of example. Further downstream, individual containers 4 are purposefully discharged, on a random basis, from the filling line 7 in a manner known per se and guided onto the discharge line section 6. The containers 4, which are successively discharged on a random basis, are then ready for putting them into the store 2 in the area of the container feed 5, where they e.g. stand upright in one row on the conveyor belt 5a.

The discharge of the containers 4 from the main product line section and the successive supply of the containers 4 to the storage and distribution unit 1 preferably takes place in response to commands of the control unit 11 or the like, in a centrally controlled manner and according to a previously specified sampling plan 12. The latter serves e.g. to functionally control the filling units 16 and the capping units 18 and comprises at least the reason for and the number of the containers 4 to be inspected offline as well as the nature of the inspections to be carried out.

The discharged containers 4 have assigned thereto e.g. data for identifying individual containers 4, the associated product batch, the product filled-in and/or an identification of the filling unit 16 used to fill the respective container 4 and/or an identification of the capping unit 18 used to close the respective container 4. Furthermore, each container 4 may have assigned thereto a time stamp of the sample and/or of the putting into storage.

When the containers 4 are put into storage, they have assigned thereto a respective storage area 3. Hence, the identity and the origin of the stored containers 4 are known, so are the respective storage area 3 occupied, i.e. the location of intermediate storage, and possibly also the dwell time of the respective container 4 in the store 2.

For executing the inspections following from the sampling plan 12, the containers 4 are taken out of their storage areas 3 on the basis of the inspection plan 13 and/or other inspection provisions and transferred to one of the inspection units 9.1, 9.2, 9.3, 9.4. The command to take a container 4 out of storage may be triggered e.g. by the control unit 11, when a specific inspection unit 9.1, 9.2, 9.3, 9.4 is available or when a predetermined or admissible waiting time of the container 4 in the store 2 has elapsed.

Since the containers 4 are unequivocally localized in the storage areas 3, all the associated sample data can reliably be assigned to the inspection results obtained at the containers 4 even after the containers 4 have been distributed to the parallel transport paths 8*a* and the inspection units 9.1, 9.2, 9.3, 9.4 connected thereto.

The fact that sampling and inspection are decoupled in time by means of the store 2 allows e.g. to change over the filling line 7 to a new product and/or production program, while the containers 4 which have been processed with the already executed production program and discharged are still waiting in the storage areas 3 for inspection.

Making use of the inspection units 9.1, 9.2, 9.3, 9.4, whose number and exclusive parallel connection is only exemplary, offline inspections of a basically arbitrary nature can be carried out at the containers 4 and/or at the product that has been filled into them, e.g. the measurement of a Brix value of the filling product, a $CO_2$ content of the filling product, a diet concentration of the filling product, a weight of the containers (filling quantity) and/or a closing force of the closure caps or the like applied to the containers 4 by means of the capping machine 17.

Such inspections may be carried out in succession as well as in parallel and over-lapping in time. This is made possible in particular by the fact that the containers 4 are distributed to parallel transport paths 8*a* while they are taken out of storage. The containers 4 are then preferably distributed to the transport paths 8*a* in such a way that the inspection units 9.1, 9.2, 9.3, 9.4 are used to capacity as evenly as possible in terms of time, whereby an inspection performance of the inspection units will be optimized in its entirety.

The measurement data of the inspection units 9.1, 9.2, 9.3, 9.4 are supplied e.g. to the control unit 11 or some other suitable computing unit for statistical evaluation. The measurement data can then be used to derive therefrom parameters relevant for quality assurance, such as minimum values, maximum values, standard deviations and process capability indices Cp, CpK or the like.

The sampling plan 12 may, for example, require sampling at regular intervals and/or per production unit, e.g. a certain number of containers 4 per batch. Such sampling is particularly suitable for control measurements of the Brix value, the $CO_2$ value and/or of a diet concentration of the filled-in product.

Samples for the control of processing units, such as the filling units 16 and the capping units 18, are preferably taken at regular time intervals for all the processing units.

Depending on the number of containers 4 discharged, inspection in the inspection units 9.1, 9.2, 9.3, 9.4 is preferably carried out in a non-destructive manner, so that the inspected containers 4 can then be returned to the main product line section of the filling line 7 for further processing (not shown).

On the basis of the above-mentioned demands on sampling and inspection, a sampling plan 12 and, optionally, an associated inspection plan 13 will preferably be established for each production program and/or product and filed electronically.

After activation of the respective sampling plan 12, the containers 4 will be taken out of and put into storage in a centrally controlled manner, e.g. by means of the control unit 11. In so doing, each container 4 taken out of storage has assigned thereto a traceable identification and, optionally, data on the employed filling units 16, the respective capping unit 18 or the like.

Intermediate storage, taking out of inspection and forwarding to the inspection units 9.1, 9.2, 9.3, 9.4 may then take place depending on the capacity and availability of the inspection units and/or according to the criteria of an inspection plan 13 adapted thereto.

It follows that, depending on the size of the store 2, i.e. the number of the individual storage areas 3, the inspections can be decoupled in a suitable manner from the associated sampling. In this context, special demands on the inspection of the containers 4 can be taken into account as regards intermediate storage, e.g. certain patterns of distribution to the inspection units 9.1, 9.2, 9.3, 9.4 and/or the observance of certain rest periods or admissible storage times of the containers 4 before the respective inspection or the like.

Thus, the storage and distribution unit 1 allows a particularly flexible and efficient production control of the filling plant 20 with constant traceability of the containers 4 to be inspected.

Figure 2:
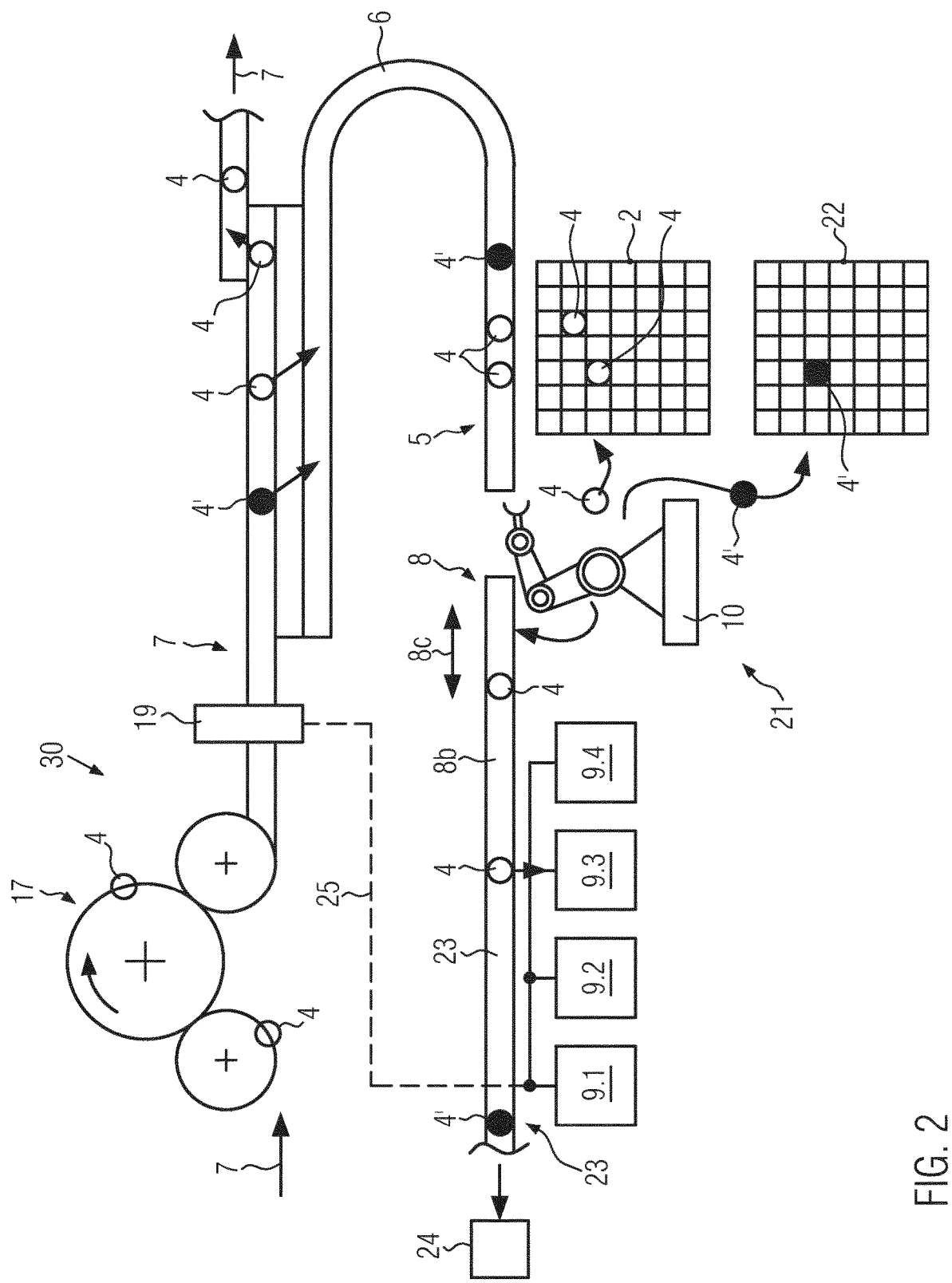
FIG. 2 shows a schematic top view of a container filling plant comprising an alternative storage and distribution unit and inspection units.

As can be seen from FIG. 2, also the storage and distribution unit 21 according to a further preferred embodiment includes a store 2 comprising a plurality of storage areas 3 for individual containers 4, the storage areas 3 being preferably distributed in a grid pattern. A paternoster store would be practicable also in this case.

The distribution unit 21 also comprises a container feed 5 for connection of the store 2 to a discharge line section 6, which branches off from a main product line section of a filling line 7 for discharging individual containers 4 on a random basis.

In addition, the discharge line section 6 is also used for discharging faulty containers 4', in particular containers that have not been properly processed. An improper condition of the containers 4', e.g. an insufficient filling level and/or an incomplete/missing closure, is detected upstream in at least one inline inspection unit 19. A faultiness detected in this way accompanies the faulty container 4' as an electronic mark on its further way at least up to the distribution unit 21.

In addition to intermediate storage in the store 2, a disposal store 22 for the disposal of faulty containers 4' is preferably provided, the robot 10 being in this case configured for selectively distributing faulty containers 4' from the container feed 5 to the disposal store 22.

There, the faulty containers 4' are deposited so gently that contamination through an overfoaming product and in particular fountains will be avoided. A filled disposal store 22 can then be emptied in the conventional way or replaced by an empty disposal store 22.

The store 2 is further followed by a container outlet 8 fed by the robot 10 and comprising a transport path 8b, which preferably runs along the entries of a plurality of inspection units 9.1, 9.2, 9.3, 9.4 and which in particular is a linear conveyor that optionally runs in opposite directions 8c. In this way, the containers 4 taken out of storage can be moved to a respective one of the inspection units 9.1, 9.2, 9.3, 9.4 in a flexible sequence.

The transport path 8b may additionally be used as a disposal conveyor 23 to a waste container 24, e.g. a dumpster or the like. In this case, the robot 10 is configured for selectively distributing faulty containers 4' to the transport path 8b or the disposal conveyor 23, in particular without intermediate storage. This means that faulty containers 4' will then be transferred directly from the container feed 5 to the container outlet 8.

Also containers 4 inspected by the inspection units 9.1, 9.2, 9.3, 9.4 can be conveyed on the transport path 8b or disposal conveyor 23 to the waste container 24.

Measurement data acquired at the inline inspection units 19 are electronically assigned to the examined containers 4, in particular to their respective position in the product stream and to the respective filling units 16, capping units 18 or the like used for processing the containers 4, so as to distinguish e.g. a properly filled and closed container 4 from an improperly filled and/or closed container 4' on its further way through the container filling plant 20, 30.

These measurement data and allocation information also accompany the containers 4 up to the inspection units 9.1, 9.2, 9.3, 9.4, by way of example, so that measurement data acquired there offline can be used e.g. for setting/calibrating the inline inspection units 19.

To this end, a feedback device 25 is preferably provided, which is used for data feedback from at least one of the inspection units 9.1, 9.2, 9.3, 9.4 connected to the container outlet 8 to at least one inline inspection unit 19 formed upstream of the discharge line section 6.

Since the offline inspection units 9.1, 9.2, 9.3, 9.4 are laboratory devices and since the latter can be operated under laboratory conditions optimized for the respective inspection, the measurement results obtained in this way will normally be more accurate than comparable measurement results of the inline inspection units 19. The latter can thus be checked, adjusted and/or calibrated on the basis of the more accurate results of the offline inspection units 9.1, 9.2, 9.3, 9.4.

In this way, the quality of the continuous inline product inspection can successively be optimized on the basis of the offline product inspection carried out on a random basis.

The embodiments according to FIGS. 1 and 2 are functionally equivalent with respect to the flexible intermediate storage and distribution of the containers 4 on the basis of sampling plans 12 and inspection plans 13 as well as with respect to the associated control functions of the control unit 11, so that individual components of these embodiments can mutually be exchanged and/or combined with one another. Hence, the control unit 11 and other components of the container filling plant 30 which are known per se have been omitted in FIG. 2 for the sake of simplicity.

Also the method steps described with respect to FIG. 1 can fully be carried out making use of the embodiment according to FIG. 2.

FIG. 2 additionally allows a separate handling of faulty containers 4' with the distribution unit 21. The embodiment according to FIG. 1 could be supplemented accordingly.

What is claimed is:

1. A storage and distribution unit for a container filling plant, comprising:
    a store comprising:
        a plurality of storage areas for storing a plurality of individual containers, the plurality of storage areas being distributed in a grid pattern;
        a container feed for connection to a discharge line section of a filling line; and
        a container outlet for connection to a plurality of inspection units; and
    a robot operatively coupled to a programmable control unit to:
        according to an electronically stored sampling plan, put a plurality of filled containers into the store by transferring the plurality of filled containers from the container feed to the plurality of storage areas; and
        according to an electronically stored inspection plan, selectively take the plurality of filled containers out of the store independently of at least one of: a moment in time at which the plurality of filled containers were put into the store, or a sequence in which the plurality of filled containers were put into the store.

2. The storage and distribution unit according to claim 1, wherein the container feed comprises a conveyor belt for successively providing containers according to a sequence of the electronically stored sampling plan.

3. The storage and distribution unit according to claim 1, wherein the plurality of storage areas comprises at least eight storage areas.

4. The storage and distribution unit according to claim 1, wherein the store further comprises at least one replaceable storage insert for providing the plurality of storage areas.

5. The storage and distribution unit according to claim 1, wherein the container outlet comprises at least one transport path for connection to at least one inspection unit of the plurality of inspection units.

6. The storage and distribution unit according to claim 1, wherein the container outlet comprises at least one transport path for connection to at least two inspection units of the plurality of inspection units.

7. The storage and distribution unit according to claim 1, further comprising at least one of a disposal store or a disposal conveyor, wherein the robot is to selectively distribute a faulty container to at least one of the disposal store or the disposal conveyor.

8. The storage and distribution unit according to claim 1, further comprising a feedback device to provide data feedback between at least one of the plurality of inspection units connected to the container outlet and an inline inspection unit formed upstream of the discharge line section.

9. The storage and distribution unit of claim 1, wherein the plurality of storage areas comprises at least sixteen storage areas.

10. The storage and distribution unit of claim 1, wherein:
    the electronically stored sampling plan specifies at least one of: a specific number of containers per unit time, a specific number of containers per production batch, or a specific number of containers per number of containers filled; and the electronically stored inspection plan specifies at least one of: a capacity of the plurality of inspection units, a time required for inspections performed by each inspection unit of the plurality of inspection units, or an availability of each inspection unit of the plurality of inspection units.

11. A container filling plant, comprising:
a storage and distribution unit comprising:
a store comprising:
a plurality of storage areas for storing a plurality of individual containers, the plurality of storage areas being distributed in a grid pattern;
a container feed for connection to a discharge line section of a filling line; and
a container outlet for connection to a plurality of inspection units;
a robot operatively coupled to a programmable control unit to:
according to an electronically stored sampling plan, put a plurality of filled containers into the store by transferring the plurality of filled containers from the container feed to the plurality of storage areas; and
according to an electronically stored inspection plan, selectively take the plurality of filled containers out of the store independently of at least one of: a moment in time at which the plurality of filled containers were put into the store, or a sequence in which the plurality of filled containers were put into the store; and
the plurality of inspection units is to perform at least one of: checking the plurality of filled containers, or checking a filling product contained in the plurality of filled containers, wherein the plurality of inspection units check at least one of the plurality of filled containers or the filing product by at least one of measuring a Brix value of the filling product, measuring a $CO_2$ content of the filling product, measuring a diet concentration of the filling product, measuring a weight of the filled containers or measuring a closing force of the filled containers.

12. The container filling plant according to claim 11, wherein the storage and distribution unit and the inspection units are arranged under a protective atmosphere in a laboratory area, which is spatially separated from the filling line.

13. A method for storing and distributing containers in a container filling plant, comprising:
putting, by a robot according to an electronically stored sampling plan, a plurality of filled containers discharged from a filling line into a store by transferring the plurality of filled containers from a container feed to a plurality of storage areas for individual containers, the plurality of storage areas being distributed in a grid pattern; and selectively taking, by the robot according to an electronically stored inspection plan, the plurality of filled containers out of the store and forwarding the plurality of filled containers taken out of the store to a plurality of inspection units, wherein the containers are selectively taken out of the store independently of at least one of: a moment in time at which the plurality of filled containers were put into the store, or a sequence in which the plurality of filled containers were put into the store.

14. The method according to claim 13, wherein the electronically stored sampling plan specifies at least one of a specific number of containers per unit time, a specific number of containers per production batch, or a specific number of containers per number of containers filled.

15. The method according to claim 13, wherein, according to the electronically stored sampling plan, the plurality of filled containers are purposefully discharged from the filling line and made available with an electronic mark and put into storage.

16. The method according to claim 13, wherein putting the plurality of filled containers into the store further comprises storing and assigning a set of information to the plurality of storage areas, the set of information comprising: a) information for identifying at least one of: the plurality of filled containers, a filling product or a product batch, and b) information for identifying at least one of: time stamps, associated filling unit numbers or associated capping unit numbers.

17. The method according to claim 13, wherein, according to at least one of the electronically stored inspection plan or an availability of associated inspection units, the plurality of filled containers are taken out of storage and, in so doing, are distributed to at least one of parallel transport paths or parallel inspection units.

18. The method according to claim 13, further comprising:
inspecting at least one of the plurality of filled containers or a filling product contained in the plurality of filled containers based on measuring at least one of a Brix value of the filling product, a $CO_2$ content of the filling product, a diet concentration of the filling product, a weight of the plurality of filled containers or a closing force of the plurality of filled containers.

19. The method according to claim 18, wherein the inspection units execute at least two different inspections at different filled containers of the plurality of filled containers such that they overlap in time.

20. The method according to claim 13, wherein the plurality of filled containers discharged from the filling line comprises a faulty container, and wherein the faulty container is mechanically put into at least one of a separate disposal store or a disposal conveyor, the disposal conveyor leading to a waste container for the faulty container.

* * * * *